United States Patent
Nordbruch et al.

(10) Patent No.: US 9,740,211 B2
(45) Date of Patent: Aug. 22, 2017

(54) METHOD AND DEVICE FOR REDUCING A HAZARD TO AND/OR BY A VEHICLE SITUATED ON A PARKING LOT

(71) Applicant: Robert Bosch GmbH, Stuttgart (DE)

(72) Inventors: Stefan Nordbruch, Kornwestheim (DE); Stefan Hoffmann, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/131,680

(22) Filed: Apr. 18, 2016

(65) Prior Publication Data

US 2016/0321929 A1   Nov. 3, 2016

(30) Foreign Application Priority Data

Apr. 30, 2015  (DE) .......... 10 2015 208 053

(51) Int. Cl.
 *B60Q 1/48* (2006.01)
 *G05D 1/02* (2006.01)
 *G05D 1/00* (2006.01)

(52) U.S. Cl.
 CPC ......... *G05D 1/0282* (2013.01); *G05D 1/0055* (2013.01); *G05D 2201/0213* (2013.01)

(58) Field of Classification Search
 CPC ............... G05D 1/0055; G05D 1/0282
 USPC ............................. 340/435, 932.2
 See application file for complete search history.

(56) References Cited

U.S. PATENT DOCUMENTS

| | | | | |
|---|---|---|---|---|
| 9,139,199 B2* | 9/2015 | Harvey | ............... | E04H 6/422 |
| 9,449,512 B2* | 9/2016 | Zafiroglu | ............... | G08G 1/065 |
| 2010/0156672 A1* | 6/2010 | Yoo | ............... | G08G 1/14 |
| | | | | 340/932.2 |
| 2012/0188100 A1* | 7/2012 | Min | ............... | G08G 1/143 |
| | | | | 340/932.2 |
| 2013/0046431 A1* | 2/2013 | Becker | ............... | B62D 15/0285 |
| | | | | 701/25 |
| 2013/0268144 A1* | 10/2013 | Du | ............... | G08C 17/02 |
| | | | | 701/2 |
| 2014/0210646 A1* | 7/2014 | Subramanya | ............... | B61L 29/28 |
| | | | | 340/928 |
| 2015/0006005 A1* | 1/2015 | Yu | ............... | G06Q 10/08 |
| | | | | 701/22 |
| 2015/0149265 A1* | 5/2015 | Huntzicker | ............... | B60W 30/06 |
| | | | | 705/13 |

(Continued)

FOREIGN PATENT DOCUMENTS

DE   102012222562   6/2014

*Primary Examiner* — Eric M Blount
(74) *Attorney, Agent, or Firm* — Norton Rose Fulbright US LLP; Gerard Messina (57) ABSTRACT

A method for reducing a hazard to and/or by a vehicle situated on a parking lot, including the following: checking a communication link between a vehicle situated on a parking lot and a parking lot management system for operating the parking lot while the vehicle is driving at least partially assisted on the parking lot with the aid of the parking lot management system; and initiating one or multiple measures in the event of a disrupted or absent communication link to reduce a hazard to the and/or by the vehicle due to the disrupted or absent communication link. Also described is a corresponding device, a vehicle, a parking lot management system, and a computer program.

10 Claims, 2 Drawing Sheets

(56) References Cited

U.S. PATENT DOCUMENTS

2015/0353080 A1* 12/2015 Mukaiyama ............ E05B 77/54
701/23

\* cited by examiner

METHOD AND DEVICE FOR REDUCING A HAZARD TO AND/OR BY A VEHICLE SITUATED ON A PARKING LOT

FIELD OF THE INVENTION

The present invention relates to a method and to a device for reducing a hazard to and/or by a vehicle situated on a parking lot. The present invention further relates to vehicle, to a parking lot management system, and to a computer program.

BACKGROUND INFORMATION

The unexamined patent application DE 10 2012 222 562 A1 refers to a system for managed parking areas for transferring a vehicle from a starting position into a target position. A stationary central processing unit is provided, which calculates a trajectory from the starting position to the target position for the vehicle. A transmission device transmits the trajectory to the vehicle.

For this purpose, generally a reliable communication link between the processing unit and the vehicle is needed. If the communication link is disrupted or absent, it is not possible to transmit the trajectory to the vehicle at all, or the transmission is faulty or incomplete. As a result, the vehicle may not be transferable or the vehicle is not transferred correctly. As a result, the vehicle may become an obstacle for further vehicles. This may cause a hazard to and/or by the vehicle.

SUMMARY OF THE INVENTION

It is thus the object of the present invention to provide a method and system which allows a hazard to and/or by a vehicle situated on a parking lot to be efficiently reduced.

This object may be achieved with the aid of the respective subject matter described herein. Advantageous embodiments of the present invention are the subject matter of the respective further descriptions herein.

According to one aspect, a method for reducing a hazard to and/or by a vehicle situated on a parking lot is provided, including the following steps:
 checking a communication link between a vehicle situated on a parking lot and a parking lot management system for operating the parking lot while the vehicle is driving at least partially assisted on the parking lot with the aid of the parking lot management system;
 initiating one or multiple measures in the event of a disrupted or absent communication link to reduce a hazard to and/or by the vehicle due to the disrupted or absent communication link.

According to still another aspect, a device for reducing a hazard to and/or by a vehicle situated on a parking lot is provided, including:
 a checking device for checking a communication link between a vehicle situated on a parking lot and a parking lot management system for operating the parking lot while the vehicle is driving at least partially assisted on the parking lot with the aid of the parking lot management system;
 a control unit for initiating one or multiple measures in the event of a disrupted or absent communication link to reduce a hazard to and/or by the vehicle due to the disrupted or absent communication link.

According to still another aspect, a vehicle is provided, including:
 a communication interface for establishing a communication link between the vehicle and a parking lot management system for operating a parking lot and for communicating with the parking lot management system via the communication link; and
 the device for reducing a hazard to and/or by a vehicle situated on the parking lot.

According to a further aspect, a parking lot management system for managing a parking lot is provided, including:
 communication link between the parking lot management system and a vehicle and for communicating with the vehicle via the communication link; and
 the device for reducing a hazard to and/or by a vehicle situated on the parking lot.

According to a further aspect, a computer program is provided, which includes program code for carrying out the method for reducing a hazard to and/or by a vehicle situated on a parking lot if the computer program is executed on a computer.

The present invention thus in particular and among other things includes the idea of checking a communication link between the vehicle and the parking lot management system, while the parking lot management system at least partially assists the vehicle while it is driving on the parking lot. If the check has yielded that the communication link is disrupted or even absent, one or multiple measures are initiated to reduce a hazard to and/or by the vehicle, this hazard resulting or being created due to the disrupted or absent communication link. This achieves in particular the technical advantage that a hazard to and/or by a vehicle situated on a parking lot may be efficiently reduced.

The parking lot management system at least partially assisting the vehicle driving on the parking lot includes, for example, one or multiple of the following specific embodiments:

1. The parking lot management system carries out fully assisted driving of the vehicle on the parking lot. This means that the parking lot management system guides the vehicle by remote control. This means that the vehicle drives remotely controlled on the parking lot with the aid of the parking lot management system during this fully assisted driving of the vehicle. The wording "at least partially assisted" thus includes the wording "fully assisted" or remotely controlled.
2. The parking lot management system transmits or sends data or pieces of information to the vehicle which the vehicle requires for autonomously driving on the parking lot. This means that the vehicle drives on its own, i.e., autonomously, according to this specific embodiment. The data necessary for this purpose include map data of a digital map of the parking lot, for example. Such data include, for example, position data of positions of further vehicles situated on the parking lot. For example, such position data include position data of an instantaneous position of the vehicle. Such data include, for example, speed data of speeds of further vehicles situated on the parking lot and/or of a speed of the vehicle. Such data include, for example, setpoint trajectory data of a setpoint trajectory which the vehicle is to follow. This means that a setpoint trajectory is predefined for the vehicle. The vehicle, however, follows this independently, i.e., autonomously. The partial assistance on the part of the parking lot management system according to this specific embodiment is thus limited to a transmission or a sending of data which the vehicle requires for autonomously driving on the parking lot. Partial assistance here means sending or transmitting data or pieces of information which the vehicle requires for autonomously driving on the parking lot.

3. The parking lot management system transmits or sends data to the vehicle which the vehicle requires for at least partially autonomous driving, in particular fully autonomous driving, on the parking lot. Such data may be, for example, data as they were described in connection with specific embodiment 2, as described above. At the same time, however, an assistance on the part of the parking lot management system takes place to the effect that it assists the vehicle while it is driving on the parking lot in addition to the transmission of the data. Such an assistance may include, for example, that signal lights situated on the parking lot are activated corresponding to the trajectory to be followed by the vehicle, so that the vehicle is able to follow the trajectory by following these signal lights. These signal lights thus act as a light signal or as a beacon. The vehicle is thus able to use these signal lights for guidance while it is driving at least partially autonomously. An assistance may include, for example, that the parking lot management system transmits or sends a correction trajectory to the vehicle when the parking lot management system has established that the vehicle is not following a predefined setpoint trajectory correctly. Partial assistance here thus means in particular sending or transmitting data or pieces of information which the vehicle requires for autonomously driving on the parking lot, and additionally further assistance of the vehicle in its partially autonomous, in particular autonomous, driving.

In one specific embodiment, two or all three of the three above-described specific embodiments may be combined with each other. The vehicle may thus drive a subleg on the parking lot according to specific embodiment 1. The vehicle drives a further subleg according to specific embodiment 2. The vehicle drives another subleg according to specific embodiment 3.

According to one specific embodiment, it is provided that the initiation includes that the vehicle initiates one or multiple of the following measures: stopping, emitting a signal with the aid of a vehicle signal device, transmitting a warning via a communication network to the parking lot management system and/or to a further vehicle situated on the parking lot.

This in particular yields the technical advantage that the vehicle may efficiently contribute to reducing the hazard.

The vehicle may stop, for example. A stationary vehicle generally poses a lesser hazard to itself and/or to further road users than a moving vehicle.

The emission of the signal with the aid of the vehicle signal device in particular yields the advantage that further road users in the surroundings of the vehicle may be warned that the vehicle may pose a hazard. In this way, the further road users my advantageously be enabled to gain knowledge that the vehicle has a problem and possibly represents an obstacle. In this way, these may carry out corresponding measures, for example to avoid the vehicle or stop.

A vehicle signal device includes, for example vehicle lighting, such as a high beam, a low beam, a side light, a parking light, a turn signal, a front fog light, an adaptive headlight, a daytime running light, a brake light, a reflector, a rear fog light, a backup light, or a side marker light. A vehicle signal device includes a horn, for example. In this way, for example, the vehicle may signal with the aid of its horn and/or with the aid of its vehicle lighting to surroundings that it has a problem. In particular, multiple signals may be emitted. A signal may be a visual signal, for example. In particular, a signal may be an acoustic signal.

Transmitting the warning via a communication network of a parking lot management system in particular yields the technical advantage that the parking lot management system is able to gain knowledge that the communication link is disrupted or absent. Accordingly, the parking lot management system may then, for example, take measures to reduce the hazard.

In particular, transmitting the warning via a communication network to a further vehicle (the plural form shall be implied) situated on the parking lot advantageously yields the technical effect that the further vehicle is able to gain knowledge that the vehicle has a problem. A communication between vehicles is in particular referred to as a "C2C" communication. Here, "C2C" denotes "car-to-car."

According to one specific embodiment, it is provided that the warning is transmitted via another communication link which is different from the communication link. This in particular yields the technical advantage that a disrupted or absent communication link does not prevent the warning from being transmitted. It is provided, for example, that the warning is transmitted via a mobile communication network when the communication link between the vehicle and the parking lot management system is a WLAN communication link. This applies in particular in the reverse case. This means that, for example, the warning is transmitted via a WLAN communication link when the communication link between the vehicle and the parking lot management system is a mobile communication link.

According to one further specific embodiment, it is provided that the initiation includes that the parking lot management system initiates one or multiple of the following measures: checking a further communication link between the parking lot management system and a further vehicle, checking whether the vehicle has stopped, adapting a traffic planning for traffic on the parking lot to the disrupted or absent communication link, sending service staff to the vehicle, closing off an area around the vehicle, driving the vehicle away, issuing a warning, informing an owner and/or a driver of the vehicle, and checking a communication system with the aid of which the communication link was established.

This in particular yields the technical advantage that the parking lot management system may efficiently contribute to reducing the hazard.

In particular, it is provided that the parking lot management system checks whether further vehicles are also affected by the disruption in the communication. This is carried out by the step of checking a further communication link between the parking lot management system and a further vehicle.

In particular, by checking whether the vehicle has stopped, it may be made sure whether or not the vehicle still poses a hazard.

In particular, the adaptation of the traffic planning yields the technical advantage that a traffic flow on the parking lot may be adapted to the problem.

Service staff sent to the vehicle may efficiently contribute to solving the problem directly on site. For example, it may be provided that an area around the vehicle is closed off, so that a safety area is formed around the vehicle. In particular driving the vehicle away from its instantaneous position may reduce a collision risk.

Informing the owner and/or the driver of the vehicle may be carried out via a communication network, for example. For example, the owner and/or the driver may be informed of this with the aid of a smart phone. This means that a corresponding message is transmitted to the smart phone and/or to the driver of the vehicle. Instead of a smart phone, the general term "mobile terminal" shall always be implied.

In particular, checking the communication system with the aid of which the communication link was established yields in particular the technical advantage that it may be made sure whether or not the communication system is responsible for the disrupted or absent communication link. Accordingly, it may then be provided that the communication system is repaired.

In one further specific embodiment, it is provided that the check includes a check as to whether a counter was counted up or down as intended based on a message transmitted via the communication link, a disrupted or absent communication link being detected if the counter was not counted up or down as intended. Counting up may be referred to as incrementing. Counting down may be referred to as decrementing.

This in particular yields the technical advantage that it is possible to efficiently check whether the communication link is disrupted or absent.

Counting up or down such a counter may be carried out as follows, for example:

The vehicle transmits a first message, which includes the information "1," for example, to the parking lot management system. In response to the receipt of this message, the parking lot management system then increments an internal counter, for example to 2. The parking lot management system then transmits a message to the vehicle including the information 2. The vehicle, in turn, increments an internal counter, for example to 3, and transmits a message including the present counter value, i.e., for example the 3, back to the parking lot management system. If the communication is absent or disrupted, for example one of the anticipated responses would not be transmitted to the vehicle or to the parking lot management system, or received by the vehicle or the parking lot management system. The corresponding internal counter would thus not be incremented, and no corresponding response including the present counter value would be transmitted back to the sender. The failure of such a response to materialize would then be recognized by the vehicle or the parking lot management system as an indication that the communication link is disrupted or absent.

According to one further specific embodiment, it is provided that the check includes a transmission of a keepalive packet via the communication link. This in particular yields the technical advantage that it is possible to efficiently check whether the communication link is disrupted or absent. A keepalive packet denotes a specific packet of a network protocol. Such packets are exchanged at regular intervals via an existing communication channel, here the communication link, between the communication partners, here the vehicle and the parking lot management system. A response is anticipated from the recipient of such a message within a predetermined time limit. If the keepalive packet or a response thereto (multiple, if necessary) fails to materialize, the corresponding communication partner assumes an interruption in the connection, so that corresponding measures are initiated.

In another specific embodiment, it is provided that the check is carried out at a predetermined frequency and/or depending on a situation parameter describing an instantaneous situation of the vehicle. Providing the check at a predetermined frequency in particular yields the technical advantage that regular automatic checks take place. In particular, the dependence of the check on a situation parameter describing an instantaneous situation of the vehicle yields the technical advantage that the check is implemented or carried out situationally. A concrete situation is thus evaluated as to whether or not it is necessary to check the communication link.

A situation in which a checking of the communication link is triggered exists, for example, when it is established that the vehicle is not carrying out, or is not correctly carrying out, a setpoint action predefined for the vehicle. This means that an actual action of the vehicle deviates from a setpoint action. For example, an actual trajectory of the vehicle may deviate from a predefined setpoint trajectory. The action here is then in particular a following of a trajectory. So as to be able to establish now whether it is due to a disrupted or absent communication link that the vehicle is not correctly carrying out its predefined setpoint action, the communication link is checked in such a situation. A situation parameter which describes such a situation includes, for example, monitoring data of a parking lot monitoring system.

A situation in which a check of the communication link is triggered exists, for example, when it is established that general communication problems are present. A general communication problem does not necessarily have to result in a disrupted communication link with the vehicle. Nevertheless, a disrupted communication link may occur due to the general communication problems. In such a situation, the communication link with the vehicle is thus checked. A situation parameter which describes such a situation includes, for example, diagnostic data and/or error data of the communication interface of the parking lot management system. Such a situation parameter includes, for example, communication data regarding a further communication link between the parking lot management system and a further vehicle. If according to these further communication data the further communication link is faulty, this may be an indication that the communication link between the parking lot management system and the vehicle may also be disrupted. This is simply the case because an error has occurred in the communication interface. Checking the communication link is thus useful here, and therefore provided in this way according to one specific embodiment.

According to one further specific embodiment, it is provided that an initiation and/or an implementation of the one or the multiple measures is/are documented. This in particular yields the technical advantage that it is possible even at a later point in time to establish with respect to the initiation and the implementation of the one or the multiple measures which measures were initiated and implemented, and in particular how these were in fact implemented. In particular, it is thus also possible to subsequently analyze the initiated and implemented measures. Documenting furthermore has the advantage that, for example in case of damage, the documentation may be used as evidence.

Specific embodiments with respect to the device are derived analogously from specific embodiments with respect to the method, and vice versa. This means that technical functionalities of the device are derived analogously from the technical functionalities of the method, and vice versa. Statements made in connection with the method apply analogously to the device, and vice versa.

According to one specific embodiment, it is provided that the device is configured or designed to implement or carry out the method for reducing a hazard to and/or by a vehicle situated on a parking lot.

According to one specific embodiment, it is provided that the vehicle is configured or designed to carry out the method.

In one further specific embodiment, it is provided that the parking lot management system is configured or designed to carry out the method.

According to one specific embodiment, for example, the control unit is thus designed or configured to stop the vehicle and/or to control a vehicle signal device to the effect that the same emits a signal. In particular, the control unit is configured or designed to transmit a warning via a communication network to the parking lot management system and/or to a further vehicle situated on the parking lot. This takes place, for example, with the aid of the communication interface of the vehicle.

If the device is included in the parking lot management system, it is provided according to one specific embodiment, for example, that the control unit is configured or designed to check a further communication link between the parking lot management system and a further vehicle. This check may be carried out analogously to the check of the communication link between the parking lot management system and the vehicle.

According to one specific embodiment, a parking lot monitoring system is provided for checking whether the vehicle has stopped. Such a parking lot monitoring system includes, for example, one or multiple video cameras and/or one or multiple radar sensors and/or one or multiple ultrasonic sensors and/or one or multiple LIDAR sensors and/or one or multiple laser sensors and/or one or multiple light barriers and/or one or multiple door opening sensors.

The above-described exemplary elements or components of the parking lot monitoring system are in particular situated distributed across the parking lot.

The control unit is then configured or designed to appropriately control the parking lot monitoring system to check whether or not the vehicle has stopped.

The control unit is thus in particular also configured or designed to adapt a traffic planning and/or to send service staff to the vehicle and/or to close off an area around the vehicle. Closing off the area may be carried out with the aid of the service staff, for example. In particular, the service staff may drive the vehicle away. The control unit is configured or designed, for example, to issue a warning and/or to operate a warning signal system situated on the parking lot in such a way that this warning signal system issues the appropriate warning.

In particular, the control unit may inform the owner or the driver of the vehicle with the aid of the communication interface. This takes place, for example, via a communication network.

In particular, the control unit may check the communication system. In particular, service staff may check the communication system.

According to one specific embodiment, a communication network includes a WLAN network and/or a mobile communication network.

In one specific embodiment, a communication via the communication network is encrypted.

According to one specific embodiment, the driving vehicle involves driving within the scope of an AVP process. AVP stands for "automated valet parking" and may be referred to as an "automatic parking process."

In the case of automated valet parking, a driver generally parks the vehicle in a drop-off position, for example in front of a parking facility, in particular a parking lot, and from there the vehicle drives at least partially assisted into a parking position, and back to the drop-off position, or in general to a pick-up position, at the end of a parking duration.

A parking lot within the meaning of the present invention may also refer to a parking area and serves as a parking area for vehicles. The parking lot thus forms in particular a contiguous surface area which includes multiple parking spaces (in the case of a parking lot on private property) or parking positions (in the case of a parking lot on public property). According to one specific embodiment, the parking lot may be included in a parking garage. The parking lot is in particular included in a garage.

Autonomously within the meaning of the present invention means in particular that the vehicle navigates or drives or is guided independently on the parking lot, i.e., without an intervention of a driver. The vehicle thus drives independently on the parking lot, without a driver having to steer the vehicle to do so. A driving includes in particular transverse and/or longitudinal guiding of the vehicle. Such an autonomously driving vehicle, which is able to automatically pull into and out of a parking space, is also referred to as an AVP vehicle, for example. AVP stands for "automated valet parking" and may be referred to as an "automatic parking process." Vehicles which do not have this AVP functionality are referred to as normal vehicles, for example. In the case of partially autonomous driving, at least a partial assistance is provided on the part of the parking lot management system.

The driving on the parking lot includes, for example, driving from a starting position to a target position. The driving in particular includes a driving from the target position back to the starting position or to a further position which is different from the starting position. The starting position is a drop-off position, for example, at which a driver drops off the vehicle for an AVP process. A target position is a parking position, for example, at which the vehicle parks at least partially autonomously, in particular autonomously. The further position is a pick-up position, for example, at which a driver may pick up his or her vehicle again after the AVP process has ended.

The present invention is described in greater detail hereafter based on the exemplary embodiments.

Hereafter, identical reference numerals may be used for identical features.

DETAILED DESCRIPTION

Figure 1:
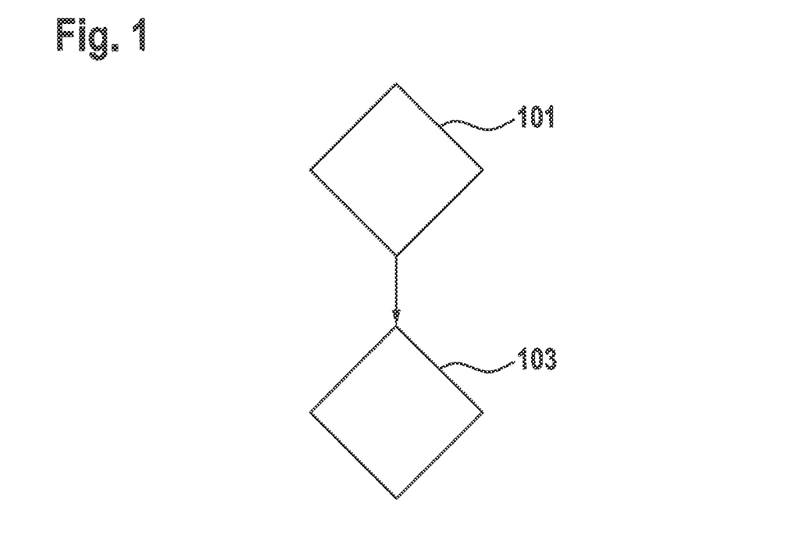
FIG. 1 shows a flow chart of a method for reducing a hazard to and/or by a vehicle situated on a parking lot.

FIG. 1 shows a flow chart of a method for reducing a hazard to and/or by a vehicle situated on a parking lot.

The method includes the following steps:
checking 101 a communication link between a vehicle situated on a parking lot and a parking lot management system for operating the parking lot while the vehicle is driving at least partially assisted on the parking lot with the aid of the parking lot management system;
initiating 103 one or multiple measures in the event of a disrupted or absent communication link to reduce a hazard to and/or by the vehicle due to the disrupted or absent communication link.

The initiation of the one or the multiple measures includes in particular an implementation of the one or the multiple measures.

Figure 2:
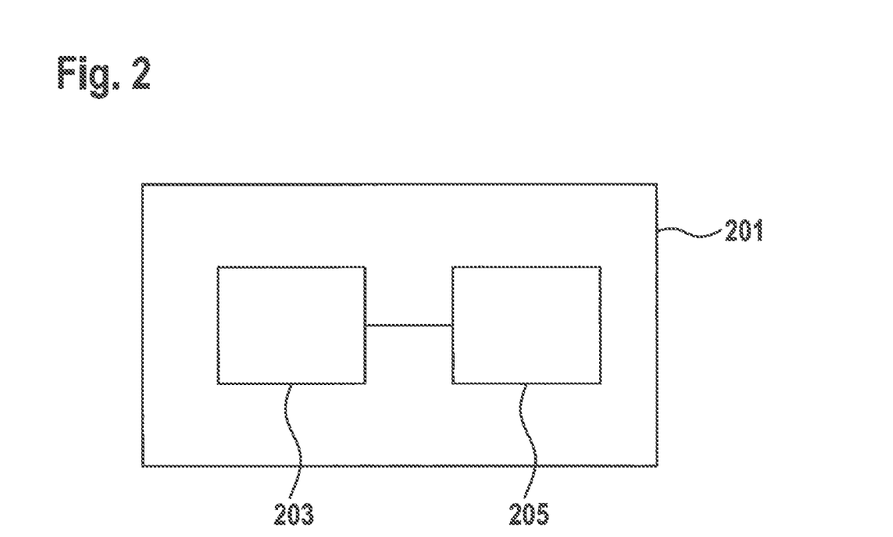
FIG. 2 shows a device for reducing a hazard to and/or by a vehicle situated on a parking lot.

FIG. 2 shows a device 201 for reducing a hazard to and/or by a vehicle situated on a parking lot.

Device 201 includes:

a checking device 203 for checking a communication link between a vehicle situated on a parking lot and a parking lot management system for operating the parking lot while the vehicle is driving at least partially assisted on the parking lot with the aid of the parking lot management system;

a control unit 205 for initiating one or multiple measures in the event of a disrupted or absent communication link to reduce a hazard to and/or by the vehicle due to the disrupted or absent communication link.

In one specific embodiment which is not shown, it is provided that device 201 includes a communication interface, which is configured or designed to establish a communication link between a vehicle and a parking lot management system and to communicate via this communication link.

Figure 3:
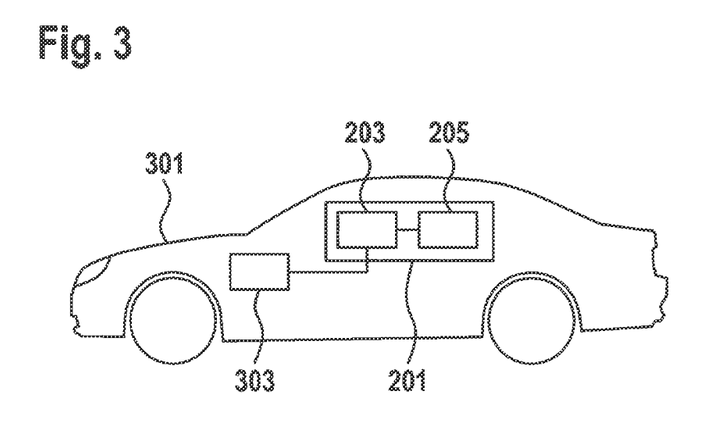
FIG. 3 shows a vehicle.

FIG. 3 shows a vehicle 301.

Vehicle 301 includes a communication interface 303 for establishing a communication link between the vehicle and a parking lot management system for operating a parking lot and for communicating with the parking lot management system via the communication link.

Vehicle 301 furthermore includes device 201 from FIG. 2.

Vehicle 301 is in particular configured or designed to carry out an AVP process on the parking lot. This takes place in particular independently or remotely controlled or partially autonomously with the aid of assistance from a parking lot management system.

Figure 4:
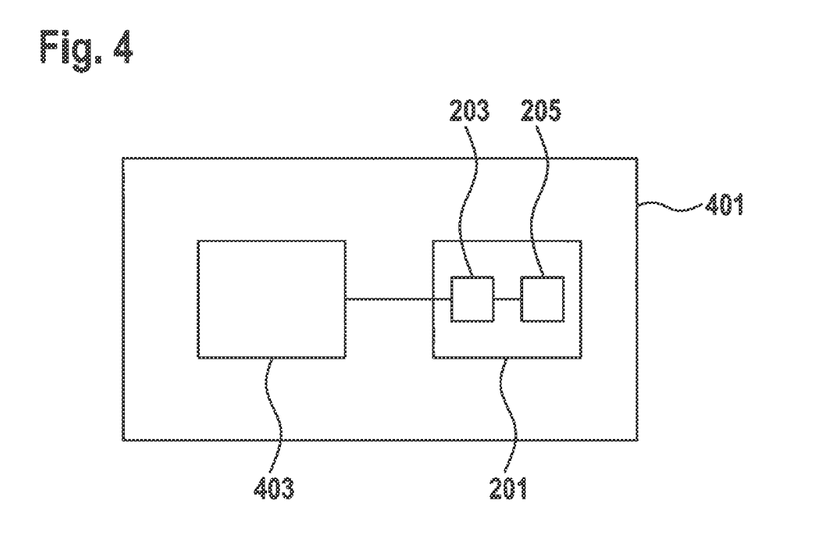
FIG. 4 shows a parking lot management system for managing a parking lot.

FIG. 4 shows a parking lot management system 401 for managing a parking lot.

The parking lot management system includes a communication interface 403 for establishing a communication link between the parking lot management system and a vehicle and for communicating with the vehicle via the communication link.

Parking lot management system 401 furthermore includes device 201 from FIG. 2.

According to one specific embodiment which is not shown, a communication interface within the meaning of the present invention is configured or designed to establish a wireless communication link between a vehicle and a parking lot management system and to communicate wirelessly via the same.

If device 201 from FIG. 2 is used or utilized in a vehicle 301, it is configured or designed in particular at least partially different from a device which is included in a parking lot management system. A control unit which initiates vehicle-specific measures, such as stopping or emitting a signal with the aid of a vehicle signal device, is in particular configured or designed differently from a control unit which, for example, sends service staff to the vehicle or which, for example, checks a further communication link between the parking lot management system and a further vehicle.

The present invention thus in particular and among other things includes the idea of providing a technical and efficient concept in which it is checked whether a communication exists between a vehicle (the plural shall be implied) and a parking lot management system, and initiates one or multiple measures when communication is absent or disrupted.

The parking lot management system may also be referred to as a parking lot administration system. If the parking lot is configured or designed as a parking garage or included in such a garage, the parking lot management system may also be referred to as a parking garage management system or as a parking garage administration system.

A parking lot management system within the meaning of the present invention in particular carries out a traffic flow control and/or in particular a guidance of one or multiple vehicles on the parking lot.

Measures which are initiated include in particular measures on the part of the vehicle and/or on the part of the parking lot management system. This means in particular that both measures with the aid of the vehicle are initiated and measures with the aid of the parking lot management system are initiated.

The check of the communication link may be carried out as follows, for example. For example, a counter in the vehicle and/or in the parking lot management system may be incremented or decremented. In the case of incrementing, the check may be carried out as follows, for example:

The vehicle transmits a "1." The parking lot management system transmits a "2" in response. The vehicle transmits a "3" in response. This may continue. When a response fails to materialize, the vehicle and/or the parking lot management system know/knows that a communication link is disrupted or absent.

In particular, according to one specific embodiment, a transmission of a time stamp may be provided, which is allowed to have only a certain time interval (such as 5 milliseconds), for example. This means that message packets are transmitted at time intervals, for example 5 milliseconds, a response being anticipated to the respective message packets. If a response fails to materialize, a disrupted communication link or an absent communication link is assumed. This is the principle of the above-described keepalive packets. The message packets are thus keepalive packets, for example.

The check of the communication link is implemented or carried out in particular regularly and/or situationally (situation parameter). If it is established in the vehicle and/or in the parking lot management system that no and/or no permanently functioning communication link (disrupted communication link) is present, measures are initiated on one or both sides.

Measures which the vehicle initiates include the following measures, for example:

An immediate stop of the vehicle (safety stop)

An indication that the vehicle has a problem and represents an obstacle (with the aid of a hazard-warning signal flasher, a horn)

The emission of a warning via a communication network to the parking lot management system, the driver and/or owner and/or to further vehicles. A communication between the vehicle and the parking lot management system may be referred to as a so-called C2I communication. Here, "C2I" denotes "car-to-infrastructure." The emission of the warning in the case of the communication network is in particular carried out when further communication channels or communication links are present via which it is possible to communicate. For example, a communication link to the parking lot management system may exist via WLAN, the warning, however, being emitted via a mobile communication network, or vice versa.

Measures which are implemented or initiated by the parking lot management system include the following measures, for example:

A check whether further vehicles are affected by the communication disruption or by the absent communication, i.e., whether a respective communication link between the parking lot management system and the vehicle or the further vehicles is disrupted or absent.

A check whether the vehicle has stopped (safety stop). This takes place, for example, with the aid of a parking lot monitoring system, i.e., in particular with the aid of cameras.

An adaptation of the traffic planning. This includes, for example, stopping all vehicles in a vicinity of the vehicle or of disabled vehicle(s). This means that, for example, a stop command is transmitted to the vehicles in the vicinity of the disabled vehicle(s) via a communication network.

The adaptation includes, for example, stopping all vehicles on the parking lot, i.e., not only the vehicles situated in the vicinity of the disabled vehicle(s). A stop command may be transmitted to these vehicles also in this instance, for example. This takes place in particular via a communication network.

Sending service staff to the disabled vehicle(s). The staff may close off an area around the vehicle or vehicles, for example. In particular, the service staff may remove or drive a vehicle away.

For example, the measure may include a warning via signs and/or loudspeakers. This means that a warning is output with the aid of a sign and/or with the aid of a loudspeaker.

In particular, it is provided that an owner and/or a driver is informed about the situation. This takes place via a communication network, for example. This means that, for example, an appropriate message regarding this information is transmitted in each case to a mobile terminal, for example a smart phone, of the owner and/or the driver.

In particular, a check of the communication systems is carried out by the parking lot management system and/or by the service staff, the communication system or the communication systems involving those communication systems which have established and/or are to establish a communication link between the vehicle and the parking lot management system.

According to one specific embodiment, the entire process, i.e., in particular the initiation and implementation of the measures, is documented for evidence purposes and/or as a basis for changes. According to a general specific embodiment, the documentation may in particular be carried with the aid of the vehicle and/or with the aid of the parking lot management system.

What is claimed is:

1. A method for reducing a hazard to and/or by a vehicle situated on a parking lot, the method comprising:
    checking a communication link between a vehicle situated on a parking lot and a parking lot management system for operating the parking lot while the vehicle is driving at least partially assisted on the parking lot with the aid of the parking lot management system; and
    initiating at least one measure in the event of a disrupted or absent communication link to reduce a hazard to the and/or by the vehicle due to the disrupted or absent communication link;
    wherein the initiating includes the vehicle initiating at least one of the following measures: stopping, emitting a signal with the aid of a vehicle signal device, transmitting a warning via a communication network to the parking lot management system and/or to a further vehicle situated on the parking lot, and
    wherein the transmission of the warning is carried out via another communication link which is different from the communication link.

2. A method for reducing a hazard to and/or by a vehicle situated on a parking lot, the method comprising:
    checking a communication link between a vehicle situated on a parking lot and a parking lot management system for operating the parking lot while the vehicle is driving at least partially assisted on the parking lot with the aid of the parking lot management system; and
    initiating at least one measure in the event of a disrupted or absent communication link to reduce a hazard to the and/or by the vehicle due to the disrupted or absent communication link;
    wherein the initiating includes the parking lot management system initiating at least one of the following measures: checking a further communication link between the parking lot management system and a further vehicle, checking whether the vehicle has stopped, adapting a traffic planning for traffic on the parking lot to the disrupted or absent communication link, sending a service staff member to the vehicle, closing off an area around the vehicle, driving the vehicle away, issuing a warning, informing an owner and/or a driver of the vehicle, checking a communication system with the aid of which the communication link was established.

3. A method for reducing a hazard to and/or by a vehicle situated on a parking lot, the method comprising:
    checking a communication link between a vehicle situated on a parking lot and a parking lot management system for operating the parking lot while the vehicle is driving at least partially assisted on the parking lot with the aid of the parking lot management system; and
    initiating at least one measure in the event of a disrupted or absent communication link to reduce a hazard to the and/or by the vehicle due to the disrupted or absent communication link;
    wherein the check includes a check as to whether a counter was incremented or decremented as intended based on a message transmitted via the communication link, a disrupted or absent communication link being detected if the counter was not incremented or decremented as intended.

4. A method for reducing a hazard to and/or by a vehicle situated on a parking lot, the method comprising:
    checking a communication link between a vehicle situated on a parking lot and a parking lot management system for operating the parking lot while the vehicle is driving at least partially assisted on the parking lot with the aid of the parking lot management system; and
    initiating at least one measure in the event of a disrupted or absent communication link to reduce a hazard to the and/or by the vehicle due to the disrupted or absent communication link;
    wherein the check includes a transmission of a keepalive packet via the communication link.

5. The method of claim 1, wherein the check is carried out at a predetermined frequency and/or depending on a situation parameter describing an instantaneous situation of the vehicle.

6. The method of claim 1, wherein an initiation and/or an implementation of the one or the multiple measures is/are documented.

7. A device for reducing a hazard to and/or by a vehicle situated on a parking lot, comprising:
- a checking device to check a communication link between a vehicle situated on a parking lot and a parking lot management system for operating the parking lot while the vehicle is driving at least partially assisted on the parking lot with the aid of the parking lot management system; and
- a control unit to initiate at least one measure in the event of a disrupted or absent communication link to reduce a hazard to and/or by the vehicle due to the disrupted or absent communication link;
- wherein the at least one measure includes at least one of the following measures: stopping, emitting a signal with the aid of a vehicle signal device, transmitting a warning via a communication network to the parking lot management system and/or to a further vehicle situated on the parking lot, and
- wherein the transmission of the warning is carried out via another communication link which is different from the communication link.

8. A vehicle, comprising:
- a communication interface to establish a communication link between the vehicle and a parking lot management system for operating a parking lot and for communicating with the parking lot management system via the communication link; and
- a device for reducing a hazard to and/or by a vehicle situated on a parking lot, including:
  - a checking device to check a communication link between the vehicle situated on the parking lot and the parking lot management system for operating the parking lot while the vehicle is driving at least partially assisted on the parking lot with the aid of the parking lot management system; and
  - a control unit to initiate at least one measure in the event of a disrupted or absent communication link to reduce a hazard to and/or by the vehicle due to the disrupted or absent communication link;
  - wherein the at least one measure includes at least one of the following measures: stopping, emitting a signal with the aid of a vehicle signal device, transmitting a warning via a communication network to the parking lot management system and/or to a further vehicle situated on the parking lot, and
  - wherein the transmission of the warning is carried out via another communication link which is different from the communication link.

9. A parking lot management system for managing a parking lot, including:
- a communication interface to establish a communication link between the parking lot management system and a vehicle and for communicating with the vehicle via the communication link; and
- a device for reducing a hazard to and/or by a vehicle situated on a parking lot, including:
  - a checking device to check the communication link between the vehicle situated on the parking lot and the parking lot management system for operating the parking lot while the vehicle is driving at least partially assisted on the parking lot with the aid of the parking lot management system; and
  - a control unit to initiate at least one measure in the event of a disrupted or absent communication link to reduce a hazard to and/or by the vehicle due to the disrupted or absent communication link;
  - wherein the at least one measure includes at least one of the following measures: stopping, emitting a signal with the aid of a vehicle signal device, transmitting a warning via a communication network to the parking lot management system and/or to a further vehicle situated on the parking lot, and
  - wherein the transmission of the warning is carried out via another communication link which is different from the communication link.

10. A computer readable medium having a computer program, which is executable by a processor, comprising:
- a program code arrangement having program code for reducing a hazard to and/or by a vehicle situated on a parking lot, by performing the following:
  - checking a communication link between a vehicle situated on a parking lot and a parking lot management system for operating the parking lot while the vehicle is driving at least partially assisted on the parking lot with the aid of the parking lot management system; and
  - initiating at least one measure in the event of a disrupted or absent communication link to reduce a hazard to the and/or by the vehicle due to the disrupted or absent communication link;
  - wherein the initiating includes the vehicle initiating at least one of the following measures: stopping, emitting a signal with the aid of a vehicle signal device, transmitting a warning via a communication network to the parking lot management system and/or to a further vehicle situated on the parking lot, and
  - wherein the transmission of the warning is carried out via another communication link which is different from the communication link.

* * * * *